United States Patent
Ahumada

(10) Patent No.: US 11,254,467 B2
(45) Date of Patent: Feb. 22, 2022

(54) A-Z EZ CADDY

(71) Applicant: A-Z EZ Caddy LLC, Scottsdale, AZ (US)

(72) Inventor: Charles Gonzalo Ahumada, Scottsdale, AZ (US)

(*) Notice: Subject to any disclaimer, the term of this patent is extended or adjusted under 35 U.S.C. 154(b) by 238 days.

(21) Appl. No.: 15/932,892

(22) Filed: May 17, 2018

(65) Prior Publication Data

US 2019/0352045 A1 Nov. 21, 2019

(51) Int. Cl.
*B65D 25/28* (2006.01)
*B65D 6/16* (2006.01)

(52) U.S. Cl.
CPC ............. *B65D 7/24* (2013.01); *B65D 25/282* (2013.01)

(58) Field of Classification Search
CPC ........ B65D 7/24; B65D 25/282; B65D 21/08; B65D 2250/105; B65D 33/02; A01G 20/43; A01G 20/40; B65F 1/0006; B65F 1/14; B65F 1/141; B65F 1/1415; B65F 2001/1489; B65F 2210/137
See application file for complete search history.

(56) References Cited

U.S. PATENT DOCUMENTS

| | | | | |
|---|---|---|---|---|
| 3,481,519 A | * | 12/1969 | Snetselaar | A45F 5/10 294/152 |
| 4,296,788 A | * | 10/1981 | Slater | A01G 20/43 383/4 |
| 4,434,829 A | * | 3/1984 | Barnard | B65B 67/1238 15/257.1 |
| 4,890,873 A | * | 1/1990 | Prada | A45F 5/10 294/138 |
| 5,709,477 A | * | 1/1998 | Schinasi | A01G 20/40 383/4 |
| D394,929 S | * | 6/1998 | Ahumada | D34/1 |
| 7,517,151 B2 | * | 4/2009 | Leone | B65D 33/16 383/10 |
| 7,984,733 B2 | * | 7/2011 | Noonan | A01G 20/43 141/337 |
| D664,730 S | * | 7/2012 | Noonan | D34/1 |
| 2004/0101213 A1 | * | 5/2004 | McDonough | B65F 1/0006 383/4 |
| 2006/0001280 A1 | * | 1/2006 | Yardley | A01G 20/40 294/214 |
| 2007/0025646 A1 | * | 2/2007 | Schoenig | B65F 1/0006 383/4 |
| 2007/0184239 A1 | * | 8/2007 | Mallory | B32B 5/028 428/99 |
| 2012/0128269 A1 | * | 5/2012 | Rittenour | B65D 33/06 383/4 |
| 2015/0314956 A1 | * | 11/2015 | Clevenger | B60R 13/01 220/9.2 |

* cited by examiner

*Primary Examiner* — Don M Anderson
(74) *Attorney, Agent, or Firm* — Joseph W Mott; Hartman Titus PLC

(57) ABSTRACT

A foldable fabric lawn and indoor/outdoor caddy that opens with a flexible spring wire loaded frame when placed on the ground. Debris/material can be swept/raked into the invention via its flexible 27" rubber sweeping edge or by other means (shovel, hands, drop-cloth). The invention can then be closed together with its two handles and locked together for transport by the user. A rear fabric handle aides in the dumping/disposal of the aforementioned debris. The invention can then be placed on the ground ready for its next use. The invention can be used for clean-up, yard/garden work, as a drop-cloth, gather trash, and construction debris.

7 Claims, 5 Drawing Sheets

Spring Wire

Spring Wire

Bottom View

Flat Position

Closed Position

A-Z EZ CADDY

CROSS REFERENCE TO RELATED APPLICATIONS

N/A

STATEMENT OF FEDERALLY SPONSORED RESEARCH OR DEVELOPMENT

N/A

JOINT RESEARCH AGREEMENT

N/A

SEQUENCE LISTING FOR COMPACT DISC

N/A

BACKGROUND OF INVENTION

There are currently a variety of different single-purpose tools in the indoor and outdoor clean-up "Home" and "Lawn & Garden Industries" industries. The clean-up process can be slowed down and complicated significantly if the user has to use multiple tools to accomplish their project.

BRIEF SUMMARY OF INVENTION

The invention allows a user to use a single tool to accomplish their clean-up projects in a more efficient manner. The invention's versatility as a sweeping/raking receptacle, drop-cloth, carry-all, and its size, allows the user to make clean-up projects faster and more efficient. The user can use fewer tools to accomplish their work. No other tool like it exists and is new to the indoor/outdoor clean-up "Home" and "Lawn & Garden" industries.

BRIEF DESCRIPTION OF SEVERAL VIEWS OF DRAWINGS

Figure 1:
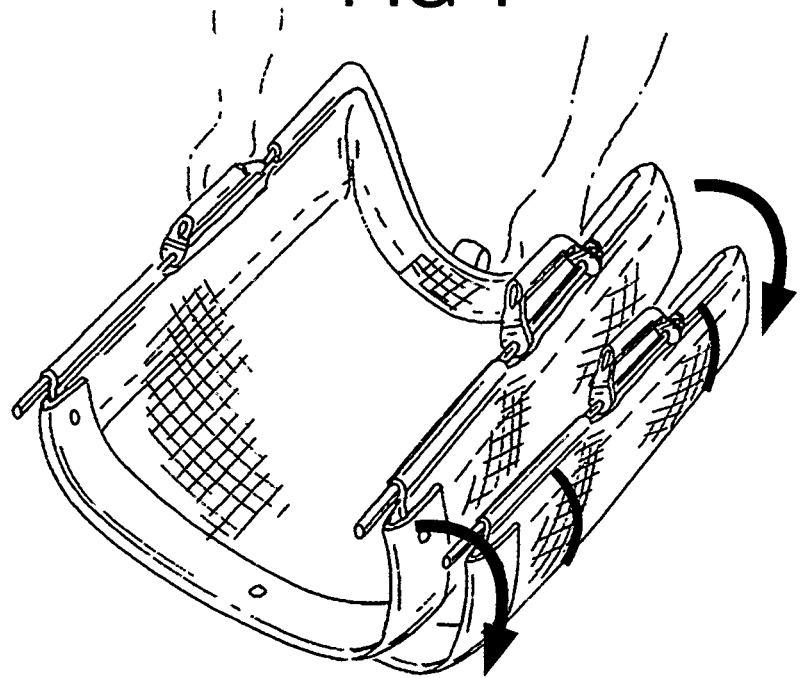

FIG. 1: A perspective view of the invention wherein the invention is shown being held in a semi-folded position by a user and the hands of the user are defined by broken lines. The arrows showing the motion of the spring-loaded frame opening to a flat position. (Note: The hands of the user that are shown in broken lines in FIG. 1. Are for illustrative purposes only and form no part of the claimed design.)

Figure 2:
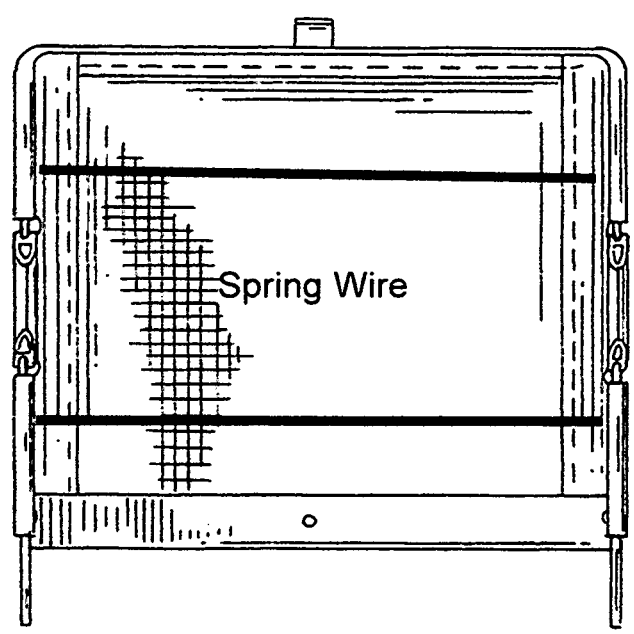
Figure 3:
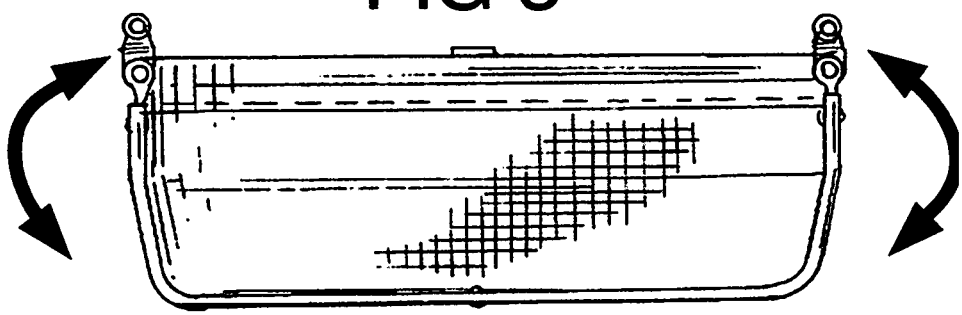
Figure 4:
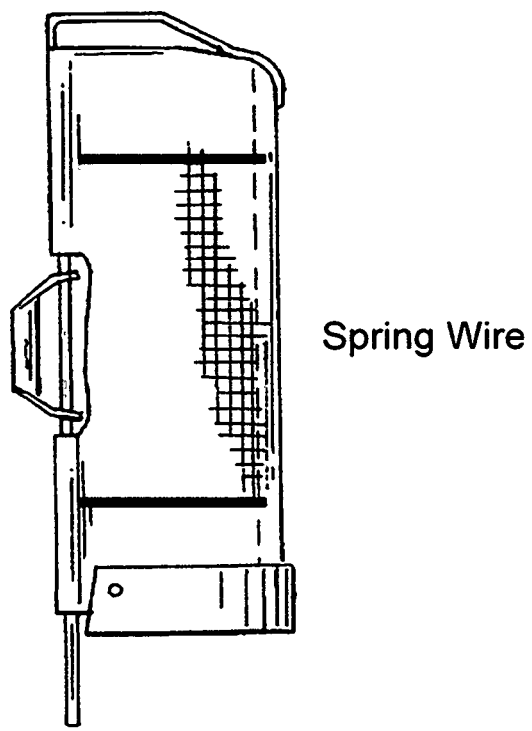
Figure 5:
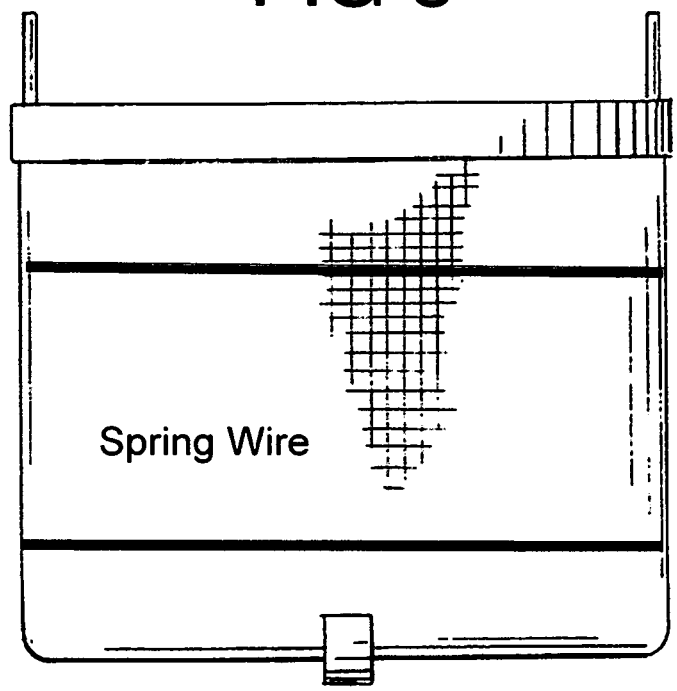
Figure 6:
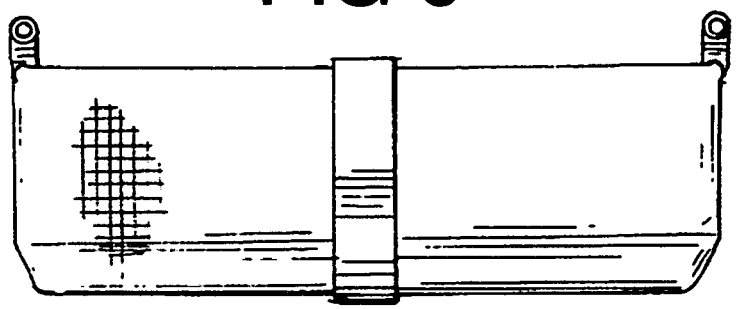
Figure 7:
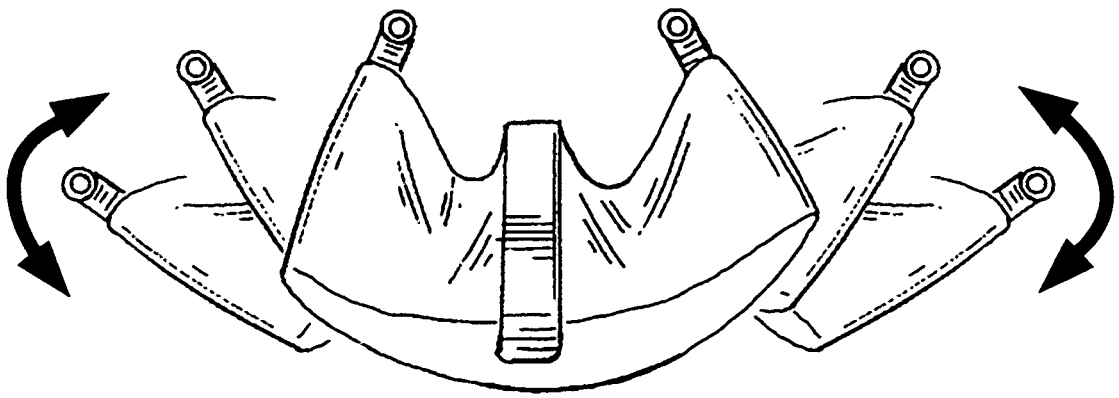
Figure 8:
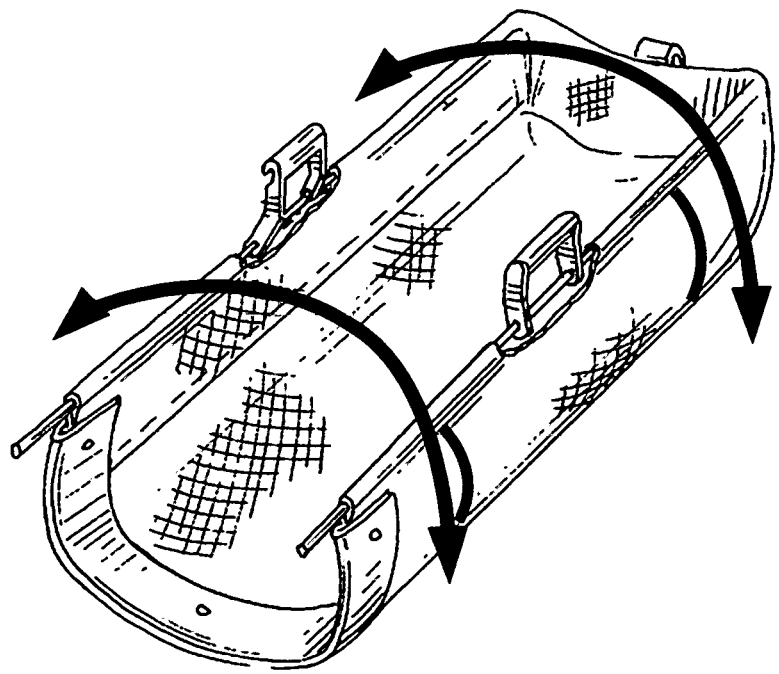

FIG. 2: A top view of the invention thereof wherein the invention is shown in an open and expanded position. The spring wire is shown keeping the invention in an open position;

FIG. 3: A front view of the invention thereof with arrows showing the spring wire keeping the invention open and side walls upright ready for debris to be swept in;

FIG. 4: A side view of the invention thereof wherein the spring wire shown flexing around the debris in a closed position;

FIG. 5: A bottom view of the invention thereof wherein the flexible wire shown keeping the invention in a fixed open position;

FIG. 6: A back view of the invention thereof wherein the invention is in an open and expanded position with back handle;

FIG. 7: A back view of invention thereof wherein the caddy is in a semi-folded position showing the motion of the spring wire flexing from a closed to open position. Keeping the invention open for the next clean-up project;

FIG. 8: A perspective view of a second embodiment thereof wherein the motion of the spring wire flexing from a closed to an open position.

Figure 9:
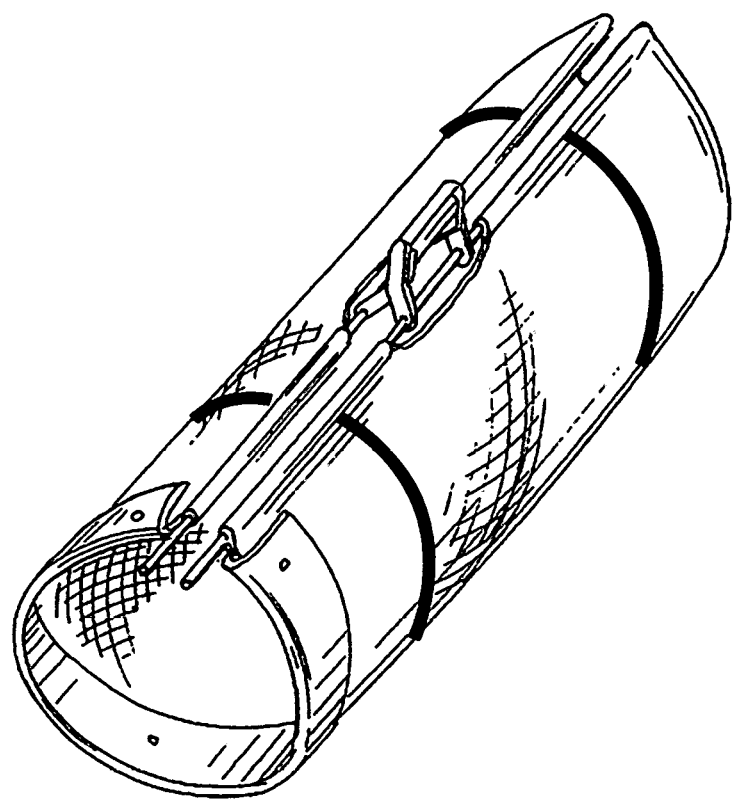

FIG. 9: A perspective view of the second embodiment foldable lawn and indoor/outdoor invention thereof having interlocking handles wherein the interlocking handles are shown in a closed and locked position.

DETAILED DESCRIPTION OF THE INVENTION

The invention is a foldable fabric lawn and indoor/outdoor caddy with a flexible 27" sweeping edge, self-opening frame (opens with sewn-in spring wires), and accepts all 24" brooms & rakes.

The invention has handles on either side attached to internal rods with a locking device that keeps the invention closed.

The invention has a rear handle to help the user when dumping material/debris.

The invention we believe to fall under the classification of "D08-499". The invention is a new entry into the clean-up industry and no other invention like it exists.

a. How the Invention Works:

The combination of the flexible sweeping edge, fabric construction and the self-opening spring wire frame creates a unique clean-up tool. Debris can be swept/raked/shoveled into the invention wherein the invention can then be closed and easily picked up by the locking handles and rear support handle. The contents of the invention can then be relocated and easily dumped out by the user. The user can then unlock the invention, lay it back down as it opens up, ready for its next use.

b. How to Make the Invention:

The components of this invention are similar to those used in the Lawn & Garden industry. The fabric grass catcher on a lawn mower has similar manufacturing steps and material. The fabric is sewn together according to the specifications in the attached 'drawings'. Metal rods (or similar strength material) are inserted into either side of the invention and fabricated handles & locking mechanism are attach to the rods (the rods slide through loops in the handles). The rubber sweeping edge is made from a mold (or similar flexible material) and is sewn to the front of the invention. A fabric handle is sewn to the rear of the unit. Flexible spring wires are sewn into the fabric frame.

c. How to Use the Invention:

Place the invention on the ground and it will open. Material/Debris can then be added via shovel, broom, rake, or by whatever mean the user deems appropriate. The user then can grasp both of the handles, close the invention, and then lock it closed. The material/debris can then be relocated and can be disposed/dumped by grabbing the rear handles and tilting the back of the invention in an upward direction. The user then can unlock the invention, lay it back down on the ground ready for its next use.

Additionally: This invention can be used is all types of cleanup projects, not just lawn and garden work.

d. The Invention Discussed Here Includes:

See attachment "Drawing Sheets"

e. Relationship Between the Components:

See attachment "Drawing Sheets"

SEQUENCE LISTING

N/A

I claim:

1. A foldable lawn and indoor/outdoor caddy comprising a fabric sheet configured to define a bottom portion, two side wall portions, a rear wall portion and an open front portion; a structural rod attached to each side wall; a handle attached to each structural rod; a reinforced sweeping edge on the front portion; and at least one spring wire affixed across the sheet from one rod to the other, wherein the spring wire biases the caddy in an open position but is capable of being bent by bringing the handles together to temporarily close the caddy thereby enclosing any contents.

2. The caddy of claim 1 further including a plurality of spring wires.

3. The caddy of claim 1 wherein the handles are capable of temporarily locking together to hold the caddy in a closed position.

4. The caddy of claim 1 further including a rear handle attached to the rear wall.

5. The caddy of claim 2 wherein the handles are capable of temporarily locking together to hold the caddy in a closed position.

6. The caddy of claim 5 further including a rear handle attached to the rear wall.

7. The caddy of claim 6 wherein the rear handle is a fabric handle.

* * * * *